United States Patent [19]

Hieda

[11] Patent Number: 5,057,927
[45] Date of Patent: Oct. 15, 1991

[54] IMAGE SENSING APPARATUS

[75] Inventor: Teruo Hieda, Kanagawa, Japan

[73] Assignee: Canon Kabushiki Kaisha, Tokyo, Japan

[21] Appl. No.: 391,128

[22] Filed: Aug. 8, 1989

[30] Foreign Application Priority Data

Aug. 31, 1988 [JP] Japan .................................. 63-216918

[51] Int. Cl.⁵ ..................... H04N 5/238; H04N 5/225; G03B 7/08; G03B 7/10
[52] U.S. Cl. ................................... 358/228; 358/909; 354/446; 354/451; 354/455
[58] Field of Search .................... 358/228, 213.19, 909, 358/219; 354/456, 451, 452, 446, 455

[56] References Cited

U.S. PATENT DOCUMENTS

| | | | |
|---|---|---|---|
| 3,150,581 | 9/1964 | Wilharm | 354/446 |
| 3,623,409 | 5/1969 | Uno | 354/456 |
| 3,728,946 | 4/1973 | Kuramoto | 354/456 |
| 3,921,185 | 11/1975 | Yazaki | 354/446 |
| 3,988,749 | 10/1976 | Frode | 354/451 |
| 4,079,392 | 3/1978 | Orban | 354/456 |
| 4,174,526 | 11/1979 | Geurts | 358/228 |
| 4,399,466 | 8/1983 | Stephenson | 358/228 |

Primary Examiner—Howard W. Britton
Assistant Examiner—Wendy R. Greening
Attorney, Agent, or Firm—Robin, Blecker, Daley & Driscoll

[57] ABSTRACT

An image sensing apparatus has a diaphragm for an imaging optical system, a selecting switch for switching between automatic control and manual control of the diaphragm, and a diaphragm controlling circuit capable of controlling and varying the operating speed of the diaphragm. The image sensing apparatus is arranged to switch and vary the operating speed of the diaphragm in accordance with the setting of the selecting switch.

17 Claims, 5 Drawing Sheets

IMAGE SENSING APPARATUS

BACKGROUND OF THE INVENTION

1. Field of the Invention

The present invention relates generally to an image sensing apparatus and, more particularly, to an image sensing apparatus which is capable of controlling and varying the speed of response of a diaphragm in an imaging optical system.

2. Description of the Related Art

The imaging optical systems of almost all compact video cameras employ diaphragm devices of a type which utilize a so-called automatic iris arranged to automatically control exposure so that the level of an image signal is maintained at a constant value. However, in such a video camera employing the automatic iris, it is not always possible to obtain proper exposure owing to various factors such as the distribution of brightness on a subject, a background or the like. In addition, a photographer may desire to intentionally shift the exposure level to an overexposure side or an underexposure side.

For this reason, a certain type of apparatus has the aforesaid automatic iris provided with a manual-control function in order to allow the photographer to manually adjust the diaphragm as required. Such an apparatus is arranged so that the photographer can vary the aperture value by switching a switch or the like. The apparatus employs, for example, the following control methods. In the first method, during automatic control, a driving shaft for diaphragm blades is caused to rotate by a motor, while, during manual control, the driving shaft is rotated by rotating an external knob. In the second method, during automatic control, the reference value of the level of the aforesaid image signal is set to a predetermined value, while, during manual control, the aperture value can be varied in accordance with a value which is set with an external dial. In the third method, an encoder for electrically reading the angle of rotation of a shaft is provided so as to exert control so that the value of the encoder is made equal to a set value on an external dial.

In any of the conventional examples, however, in order to enhance the stability of the operation during automatic control, it is necessary to increase the time constant of diaphragm servo control. As a result, the operation during manual control lacks smoothness, thus resulting in the problem that the operation does not correspond to an actual variation in the aperture value.

In addition, if the imaging optical system is arranged to be detachably secured to the camera body, it has been impossible to completely satisfy the requirement of the ease of coupling therebetween.

SUMMARY OF THE INVENTION

It is, therefore, an object of the present invention to provide an image sensing apparatus capable of overcoming the above-described problem with the related art.

It is another object of the present invention to provide a diaphragm which is improved in stability and operability during manual control.

To achieve the above objects, in accordance with the present invention, there is provided an image sensing apparatus which comprises a diaphragm for an imaging optical system, a selecting switch for switching automatic control and manual control of the diaphragm, and a diaphragm controlling circuit capable of controlling and varying the operating speed of the diaphragm. The image sensing apparatus is arranged to switch and vary the operating speed of the diaphragm in accordance with the setting of the selecting switch.

With these arrangement and construction, it is possible for a photographer to smoothly set the desired aperture value even in a manual mode without experiencing a sense of incompatibility.

Further objects, features and advantages of the present invention will become apparent from the following detailed description of embodiments of the present invention with reference to the accompanying drawings.

DETAILED DESCRIPTION OF THE PREFERRED EMBODIMENT

A preferred embodiment of the present invention will be described in detail below with reference to the accompanying drawings.

Figure 1:
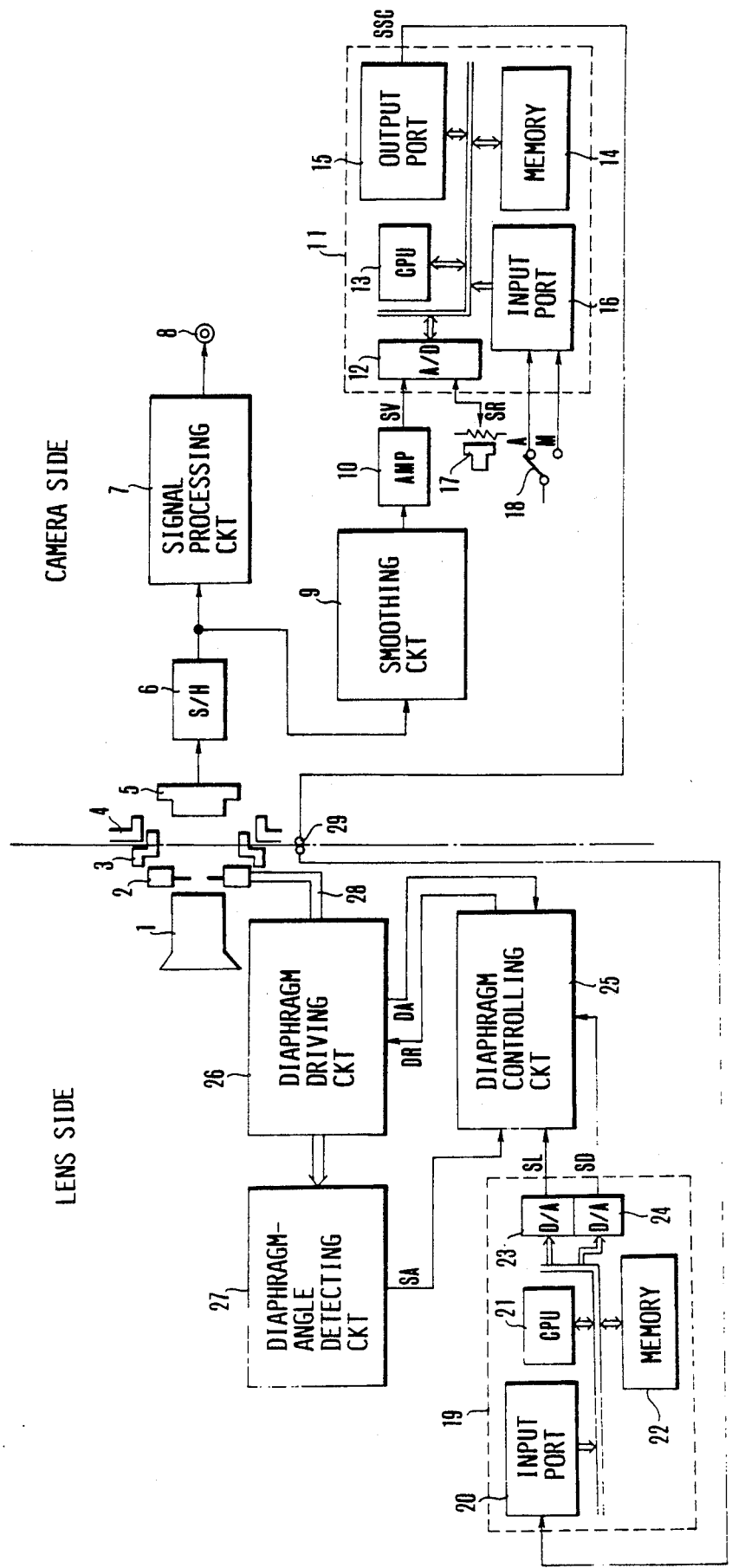
FIG. 1 is a block diagram showing an embodiment of the present invention.

FIG. 1 shows the embodiment of the present invention. The illustrated embodiment comprises the following major elements: an imaging lens 1; a diaphragm 2; a mount member 3 for selectively coupling the lens to the camera body, the mount member 3 being disposed on the lens side; a mount member 4 similar to the mount member 3 but disposed on the camera side; a CCD 5 serving as an image sensor; a sample-and-hold circuit 6; a signal processing circuit 7 for the camera; an output terminal 8; a smoothing circuit 9; an amplifier 10; a microcomputer 11 provided on the camera side and consisting of an A/D converter 12, a CPU 13, a memory 14, an output port 15, an input port 16 and the like. The illustrated embodiment also includes a setting dial 17 for manual diaphragm control; a selecting switch 18 for selecting automatic diaphragm control A or manual diaphragm control M; a microcomputer 19 provided on the lens side; an input port 20; a CPU 21; a memory 22; D/A converters 23 and 24; a diaphragm controlling circuit 25 for providing control over the diaphragm 2 in accordance with an input diaphragm operating signal $S_L$ and an input diaphragm's operating-speed controlling signal $S_D$; a diaphragm driving circuit 26 for driving a diaphragm rotating shaft in accordance with a diaphragm driving voltage $D_R$; a diaphragm-angle detecting circuit 27 for detecting the angle of rotation of the diaphragm rotating shaft; a diaphragm rotating mechanism 28; and an electrical signal contact 29 for communication between the camera and the lens.

Then, the operation of the embodiment will be described below. An image of a subject (not shown) is conducted through the imaging lens 1 and the diaphragm 2 and is then formed on the CCD 5, where it is converted into an electrical signal. This electrical signal is supplied to the sample-and-hold circuit 6. One part of the output of the sample-and-hold circuit 6 is supplied to the signal processing circuit 7, where it is formed into a video signal. This video signal is provided at the output terminal 8 which is connected to, for example, a VTR (not shown). The other part of the output of the sample-and-hold circuit 6 passes through the smoothing circuit 9 and the amplifier 10, and the resulting average brightness signal is input to the A/D converter 12 of the microcomputer 11. Moreover, the output from the setting dial 17 is input to the A/D converter 12 of the microcomputer 11, while the output from the selecting switch 18 is input to the input port 16 of the same. The CPU 13 operates in accordance with a program stored in the memory 14 and controls the output port 15 to generate a serial control signal SSC. This serial control signal SSC is transferred to the lens side through the contact 29 and input to the input port 20 of the microcomputer 19. The CPU 21 of the microcomputer 19 operates in accordance with a program stored in the memory 21 to generate the diaphragm operating signal $S_L$ by means of the D/A converter 23 and the diaphragm's operating-speed controlling signal $S_D$ by means of the D/A converter 24. Further, the microcomputer 19 causes the diaphragm controlling circuit 25 to generate the diaphragm driving voltage $D_R$, thereby causing the diaphragm driving circuit 26 to rotate the diaphragm 2 by means of the diaphragm rotating mechanism 28 so as to open and close the diaphragm 2. At the same time, the diaphragm-angle detecting circuit 27 operates to detect the angle of rotation of the diaphragm rotating mechanism 28 and forms a detection output $S_A$. At this time, the diaphragm driving circuit 26 outputs a signal $D_A$ indicative of a particular driving speed.

Figure 2:
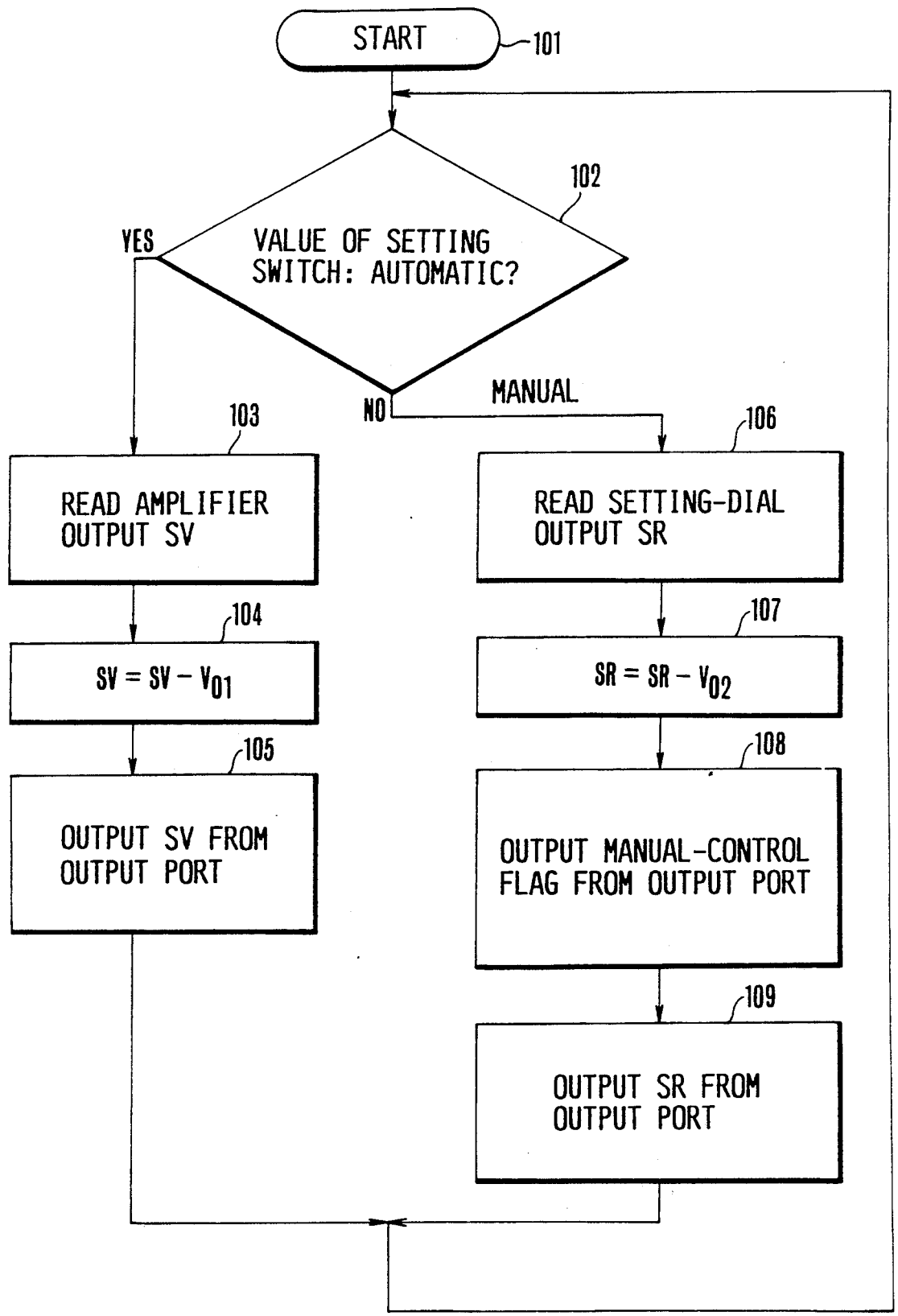
FIG. 2 is a flow chart showing the operation of a microcomputer provided on the camera side in accordance with the present invention.

FIG. 2 is a flow chart showing the operation of the microcomputer 11 provided on the camera side. In Step 101, the process starts and, in Step 102, whether the value of the setting switch 18 indicates the automatic control A or the manual control M is determined. If the automatic control A is selected, the process proceeds to Step 103, where the output $S_V$ of the amplifier 10 is read into the microcomputer 11. Then, in Step 104, a predetermined reference value $V_{01}$ is subtracted from the output $S_V$ and, in Step 105, the result is output from the output port 15. On the other hand, if the setting switch 18 is set to the manual-control side, the process proceeds to Step 106, where the output $S_R$ from the setting dial 17 is read into the microcomputer 11. In Step 107, a predetermined reference value $V_{02}$ is subtracted from the output $S_R$ In Step 108, a flag indicative of the manual control is output from the output port 15 and, in Step 109, the output $S_R$ formed in Step 107 is output from the output port 15.

Figure 3:
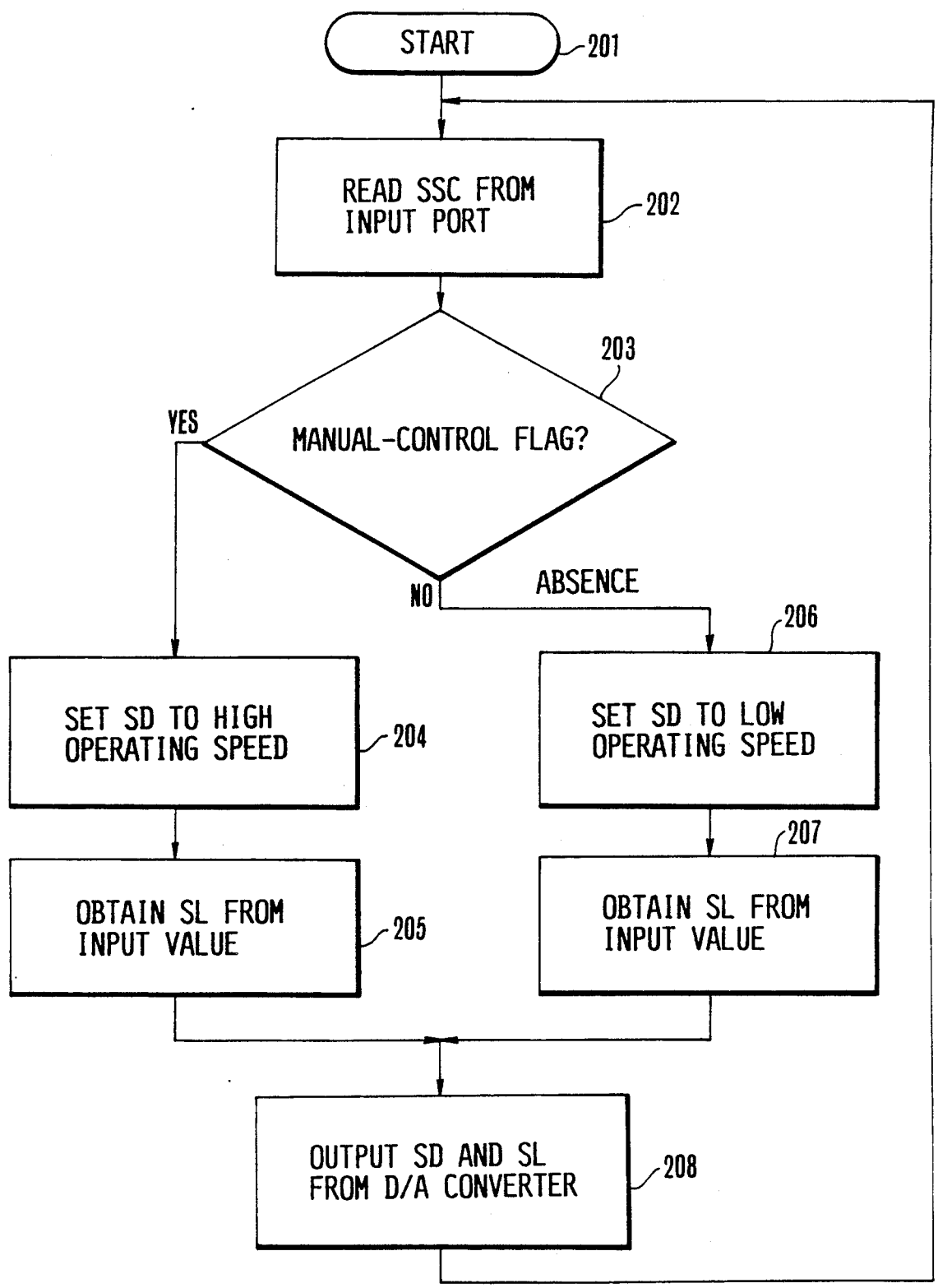
FIG. 3 is a flow chart showing the operation of a microcomputer provided on the lens side in accordance with the present invention.

FIG. 3 is a flow chart showing the operation of the microcomputer 19 provided on the lens side. In Step 201, the process starts and, in Step 202, the microcomputer 19 reads the serial control signal SSC from the input port 20. Then, in Step 203, the presence or absence of the manual-control flag is determined. If such a flag is present, the process proceeds to Step 204, where the diaphragm's operating-speed control signal $S_D$ is set to a state corresponding to a high operating speed and, in Step 205, the diaphragm operating signal $S_L$ is obtained from the input value. If there is no manual-control flag, the process proceeds to Step 206, where the diaphragm's operating-speed control signal $S_D$ is set to a state corresponding to a low operating speed. Then, in Step 207, the diaphragm operating signal $S_L$ is obtained from the input value. Accordingly, in Step 208, the signals $S_L$ and $S_D$ are output from the respective D/A converters 23 and 24, and the process returns to Step 202.

Figure 4:
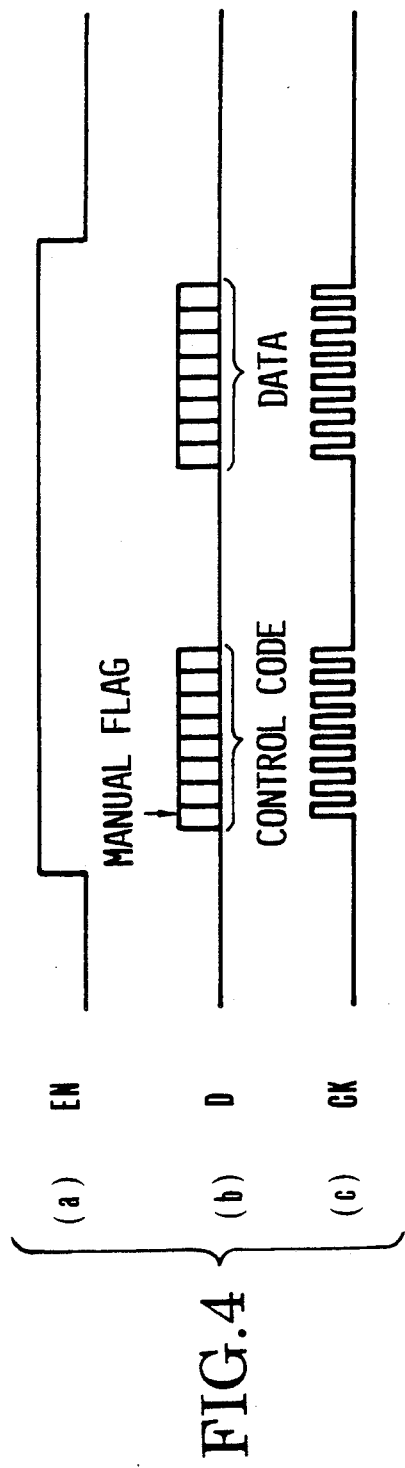
FIG. 4 is a diagram which serves to illustrate the operation of the present invention.

FIG. 4 shows an example of a method of transferring the serial control signal SSC. This example shows a case where the signal SSC is transferred by using three lines. Part (a) represents an enable signal EN, Part (b) represents a data signal D, and Part (c) represents a clock signal CK. These signals are output from the microcomputer 11 provided on the camera side, and are then input through the contact 29 into the microcomputer 19 provided on the lens side. The enable signal EN is set to its high level when signal transfer is carried out in a transfer-enable state, but, in the other cases, is set to its low level.

The data signal D is a signal consisting of 2 bytes of 8-bit signals, and the first 1 byte represents a control code and the second 1 byte represents data. The first bit of the control code represents a manual-control flag and, if the setting switch 18 is set to the manual-control side, the manual-control flag is set to its high level, while if it is set to the automatic-control side, the manual-control flag is set to its low level.

The clock signal CK is a synchronizing clock, and the microcomputer 19 provided on the lens side reads the data signal D in synchronization with the rise of the clock signal CK.

Figure 5:
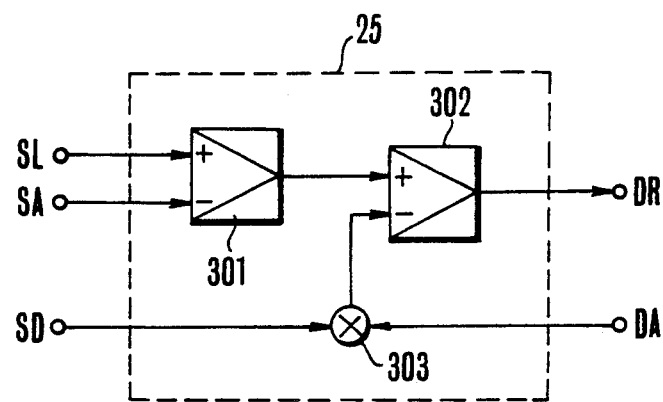
FIG. 5 is a detailed circuit diagram of a diaphragm controlling circuit according to the present invention.

FIG. 5 is a detailed circuit diagram showing the diaphragm controlling circuit 25.

In the figure, amplifiers are denoted by 301 and 302, and a multiplier is denoted by 303. The amplifier 301 amplifiers the difference between the diaphragm operating signal $S_L$ and the diaphragm-angle data $S_A$, and also the multiplier 303 multiplies the driving-speed data $D_A$ by the flag $S_D$. The amplifier 302 amplifiers the outputs of both the amplifier 301 and the multiplier 303 to output the result as the diaphragm driving voltage $D_R$. In this manner, the diaphragm driving circuit 26 is activated to form a loop with the diaphragm rotating mechanism 28, the diaphragm-angle detecting circuit 27 and the diaphragm-angle data $S_A$, thereby making the diaphragm operating signal $S_L$ and the diaphragm-angle data $S_A$ equal to each other. On the other hand, another loop is formed among the diaphragm driving voltage $D_R$, the diaphragm driving circuit 26 and the driving-speed data $D_A$ so that the operating speed of the diaphragm rotating mechanism 28 is set to a value defined by the flag $S_D$.

Accordingly, if the flag $S_D$ varies, the operating speed also varies.

In the above-described embodiment, although the method of transferring the diaphragm control signal is a serial transfer method utilizing a microcomputer, it is also preferable to use an ordinary type of parallel transfer method which utilizes no microcomputer and in which signal lines are connected to each other.

Moreover, in the above-described embodiment, although the method of controlling the diaphragm utilizes the detection of the angle of rotation of the driving shaft, it is also preferable to control the diaphragm by using, for example, a method of counting the number of driving pulses generated from a pulse motor.

In addition, although the above-described embodiment utilizes the method of transferring the manual-control flag at the time of manual control, it is also preferable to adopt a method of changing the value of the diaphragm's operating-speed controlling signal and directly transferring the result.

As described above, in accordance with the present invention, it is possible to achieve a video camera having a diaphragm which can operate stably and smoothly at the time of both manual control and automatic control.

What is claimed is:

1. An image sensing apparatus comprising:
    a diaphragm for an imaging optical system;
    switching means for switching automatic control and manual control of said diaphragm; and
    controlling means for switching operating speeds of said diaphragm in accordance with a switching operation of said switching means.

2. An image sensing apparatus according to claim 1, wherein said imaging optical system is detachably mounted on said imaging sensing apparatus.

3. An image sensing apparatus according to claim 1, wherein said controlling means is arranged to reduce the operating speed of said diaphragm during said automatic control compared to that during said manual control.

4. An image sensing apparatus according to claim 2, wherein said switching means is provided in said image sensing apparatus.

5. An image sensing apparatus comprising:
    (a) image sensing means;
    (b) exposure means for controlling the exposure condition of said image sensing means; and
    (c) controlling means arranged to be switchable between a first mode for controlling said exposure means by employing an output signal of said image sensing means and a second mode which allows manual control of said exposure means, said controlling means varying operating speed characteristics of said exposure means in accordance with the switchover between said first mode and said second mode.

6. An image sensing apparatus according to claim 5, wherein said exposure means is detachably mounted on a body including said image sensing means.

7. An image sensing apparatus according to claim 5, wherein said controlling means reduces the speed of operational response of said exposure means in said second mode compared to that in said first mode.

8. An image sensing apparatus according to claim 5, wherein said exposure means comprises a diaphragm member.

9. An image sensing apparatus according to claim 5, wherein said exposure means is controlled by an electrical signal caused by a manual operating member in said second mode.

10. A lens unit detachably mounted to a camera body comprising:
    (a) an exposure means for changing an exposure condition for a light receiving means in said camera body;
    (b) switching means for switching between automatic control and manual control of said exposure means in response to a switching signal; and
    (c) control means for controlling response characteristics of said exposure means in response to said switching signal.

11. A lens unit according to claim 10, wherein said exposure means includes a diaphragm.

12. A lens unit according to claim 10, wherein said response characteristics include a speed response characteristic.

13. A lens unit according to claim 10, wherein said light receiving means includes image sensing means.

14. A lens unit according to claim 13, wherein said image sensing means includes a pickup means.

15. A lens unit according to claim 10, said camera body further comprising signal generating means for generating said switching signal.

16. A lens unit according to claim 15, said camera body further comprising a transmitting means for transmitting said switching signal to said lens unit.

17. A lens unit according to claim 16, comprising a receiving means for receiving said switching signal from said camera body.

* * * * *